UNITED STATES PATENT OFFICE.

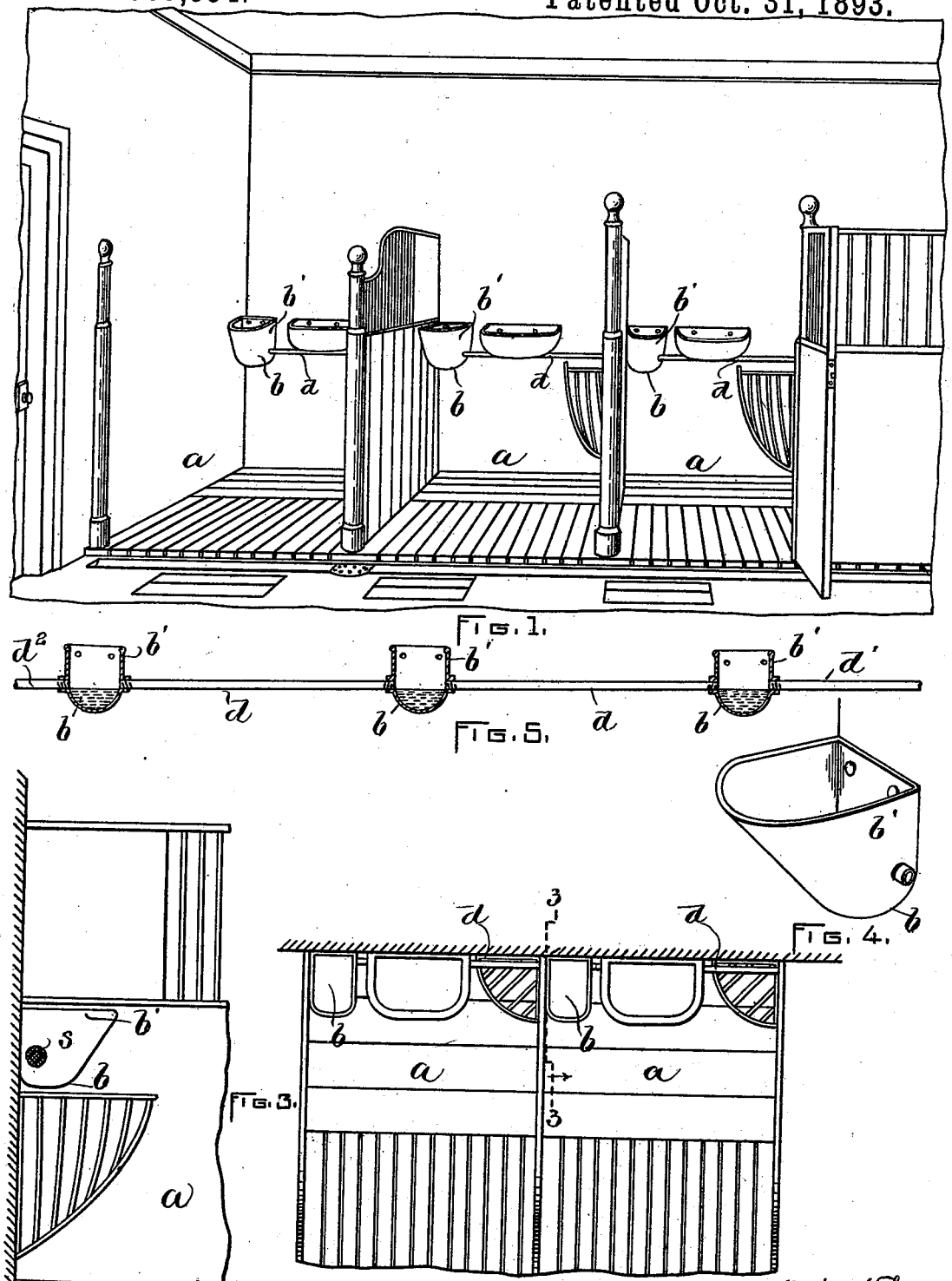

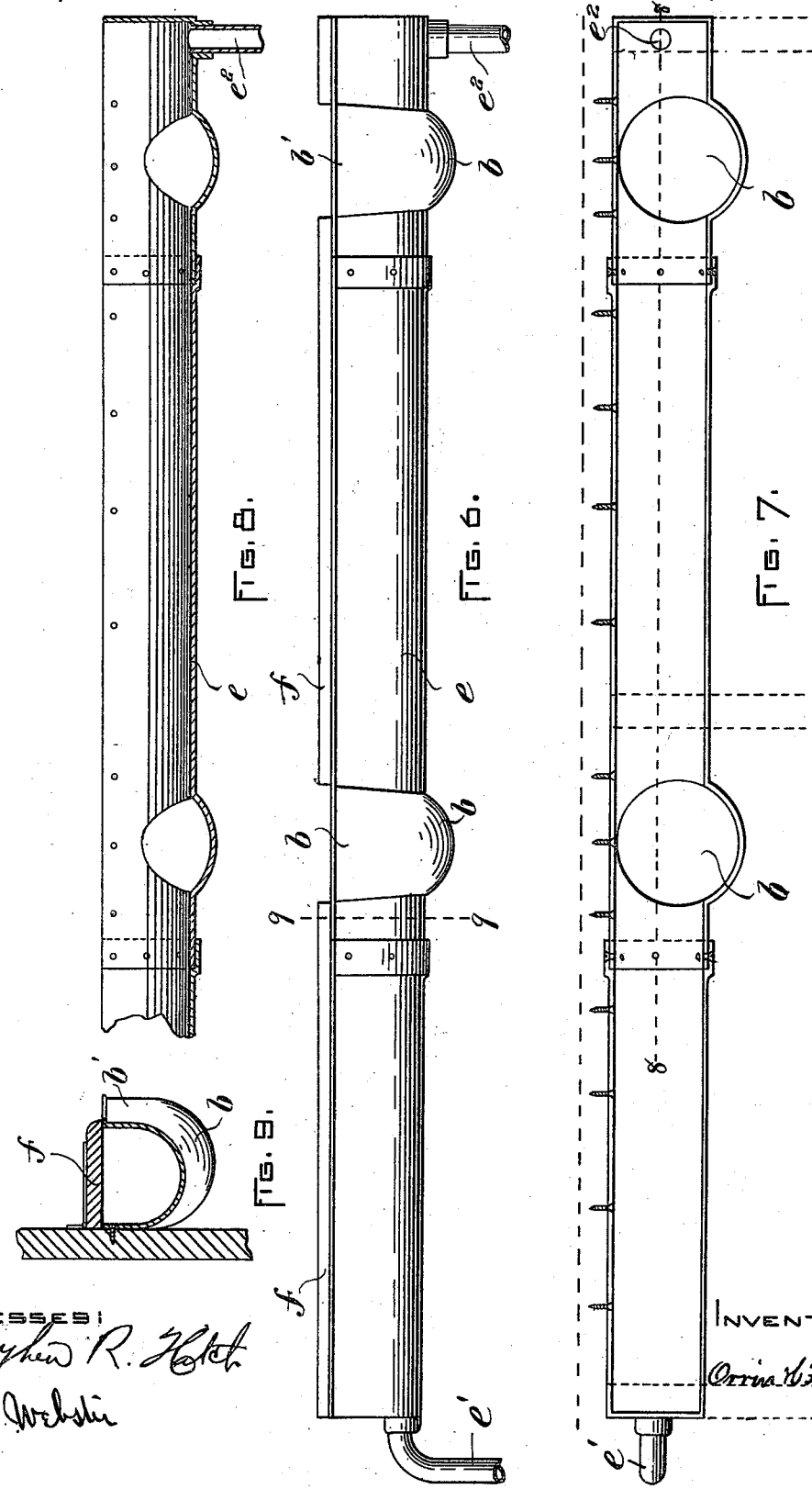

ORRIN H. FLAGG, OF NEW BEDFORD, ASSIGNOR TO CHARLES H. HALL, OF BOSTON, MASSACHUSETTS.

APPARATUS FOR WATERING LIVE STOCK.

SPECIFICATION forming part of Letters Patent No. 507,534, dated October 31, 1893.

Application filed April 17, 1893. Serial No. 470,682. (No model.)

*To all whom it may concern:*

Be it known that I, ORRIN H. FLAGG, of New Bedford, in the county of Bristol and State of Massachusetts, have invented certain new and useful Improvements in Apparatus for Watering Live Stock, of which the following is a specification.

This invention has for its object to provide means for continuously supplying water to live stock, in such manner as to permit the frequent drinking of small drafts and prevent the two rapid accumulation of water in the stomach of an animal drinking; the aim of the invention being to enable an animal, while standing in a stall or at any other station, to drink whenever so minded, without being able to drink too copiously in a short space of time, so that horses put up while in a heated condition can take frequent drafts, the quantity taken at each draft being so limited that there will be no liability of injury. It is an acknowledged fact that a continuous supply of water, always accessible to a horse while standing in a stable, is advantageous, because a horse, when left to his own instinct and allowed to take frequent drafts, consumes much less water in a day than he would if watered at comparatively infrequent intervals.

The invention also has for its object to prevent the scattering or "slopping" of water by horses and other animals, when the water is continuously supplied in such proximity to the manger that it is at all times accessible.

To these ends, the invention consists, first, in a stock-watering apparatus, consisting of a fixed water-receptacle located in such proximity to a stall or other like station that it can be reached by the animal confined thereat, said receptacle having a supply-pipe or inlet connected with a source of water-supply, and an overflow-pipe or outlet arranged to permit only a limited accumulation of water in the receptacle, the quantity accumulated being preferably one quart or less, so that the animal is unable to drink continuously to an unsafe extent, but is obliged to await the refilling of the receptacle after each draft, the length of time required for refilling being determined by the rapidity of the supply through the inlet.

The invention also consists in a stock-watering apparatus consisting of a receptacle having a supply-pipe or inlet, an overflow or outlet arranged to permit only a limited accumulation of water in the receptacle, and a guard above the outlet, formed to prevent the animal from scattering or "slopping" the water.

The invention also consists in a water-supply system for a series of stalls or other like stations, the same comprising a series of receptacles located at different heights and each connected with the next by an inclined conduit, so that water will flow from one receptacle to the next, there being one receptacle for each stall; an inlet or supply-pipe, arranged to deliver water to the highest receptacle; and an outlet or waste-pipe, arranged to conduct water from the lowest receptacle, the outlets of the several receptacles being arranged to permit only a limited accumulation of water in each receptacle, the water flowing from one receptacle to the next throughout the series.

Of the accompanying drawings, forming part of this specification: Figure 1 represents a perspective view of a series of stalls provided with my improved watering apparatus. Fig. 2 represents a plan view, showing portions of two of said stalls. Fig. 3 represents a section on line 3—3, Fig. 2, looking toward the right. Fig. 4 represents a perspective view of one of the receptacles. Fig. 5 represents an elevation showing the series of receptacles in section. Fig. 6 represents a side elevation and Fig. 7 a top view of a modified form of construction. Fig. 8 represents a section on line 8—8, Fig. 7. Fig. 9 represents a section on lines 9—9, Figs. 6 and 8.

The same letters of reference indicate the same parts in all the figures.

In the drawings: *a a a* represent a series of stalls, and *b b b* represent a series of water-receptacles affixed to suitable supports within the stalls, there being one of said receptacles for each stall. I prefer to give each receptacle the form shown in Figs. 1 to 5, each having a vertical back, an inclined front and a concaved bottom, this form being best suited to the shape of a horse's head. The receptacles are preferably made of cast-iron, although any other suitable material may be employed. The receptacles are located at different heights, the receptacle at one end of the series being the highest, while that at the other end is the lowest. Each receptacle has an inlet and an outlet, the inlet being connected with a suitable source of water-supply, so that water is continuously supplied to the receptacles. The outlet of each receptacle is located at such height above the bottom thereof that water cannot accumulate in any receptacle beyond a predetermined quantity, which is preferably about one quart, each receptacle being of such size that, when filled up to the level of the outlet, it will contain about the quantity above mentioned. The receptacles are connected by inclined conduits, each of which constitutes the outlet of one receptacle and the inlet of the next lower receptacle, the arrangement being such that the same water will flow through all the receptacles of the series, and will pass out through the outlet of the lowest receptacle, said outlet communicating with a waste-pipe leading to any convenient point. It will be seen that, when water is permitted to flow continuously through the series of receptacles as in practice will be done, each receptacle will contain a limited supply of water always accessible to the occupant of the stall, and that, after drinking the accumulation in the receptacle, the animal is obliged to wait until the receptacle is refilled before drinking again; hence a heated horse can be safely left in a stall and supplied automatically with water, without danger of being injured by excessive drinking. Moreover, the animal is enabled to drink as frequently as he may desire, and is therefore not liable to drink more than a desirable quantity in a given length of time.

In the construction shown in Figs. 1 to 5 inclusive, the receptacles $b$ are connected by lengths of pipe or tubing $d$, the highest receptacle having an inlet-pipe $d'$, while the lowest receptacle has an outlet or overflow-pipe $d^2$.

In the construction shown in Figs. 6 to 9 inclusive, the receptacles $b$ are enlargements of an inclined cast-metal trough $e$, which is or may be made in sections, as shown, the portions of said trough between the receptacles constituting inclined conduits which are equivalents of the pipes $d\ d$, each receptacle having an inlet and an outlet, relatively arranged to produce the result aimed at by my invention. One end of the trough $e$ is provided with an inlet pipe $e'$, and the other end with an outlet-pipe $e^2$. All portions of the trough, excepting the enlargements constituting the receptacles $b$, may be protected by hinged covers $f$ (Figs. 6 and 9), to prevent hay and other litter from accumulating in the trough. The concave form of the bottoms of the receptacles permits the ready removal by hand or otherwise of such litter as may accumulate in the receptacles. The outlet of each receptacle may be provided with a strainer $s$ (Fig. 3), to prevent litter from being carried by the water from the receptacles into the pipes or conduits.

The walls of each receptacle are extended above the outlet, and are formed to constitute a guard $b'$, adapted to prevent the animal from scattering or "slopping" the water. A horse, when his thirst is satisfied, frequently plays with water and throws it about, when allowed free access to the receptacle from which he has been drinking. This tendency is prevented by the guard $b'$, so that there is no liability of wetting the floor of the stall.

This apparatus may be adapted to the requirements of the stalls of fire-engine houses, where the horses go forward in leaving the stalls, by offsetting or depressing the conduits connecting the receptacles, so that the horses can pass over said conduits in leaving the stalls.

I claim—

1. A stock-watering apparatus, comprising a series of receptacles located at different heights, and each connected with the next by an inclined conduit, so that water will flow from one receptacle to the next; an inlet or supply-pipe, arranged to deliver water to the highest receptable; and an outlet or waste-pipe, arranged to conduct water from the lowest receptacle; the outlets of the several receptacles being intermediate the top and bottom thereof to determine the depth and permit only a limited accumulation of water in each receptacle, all of the outlets being normally open at the level described to prevent the rise of water above said outlets substantially as and for the purpose specified.

2. A stock-watering apparatus, comprising a series of receptacles located at different heights, and each connected with the next by an inclined conduit, so that water will flow from one receptacle to the next; an inlet or supply-pipe, arranged to deliver water to the highest receptacle; an outlet or waste-pipe, arranged to conduct water from the lowest receptacle; and strainers, applied to the outlets of the receptacles, whereby obstructions are prevented from passing from the receptacles into the conduits or pipes leading therefrom, the outlet of each receptacle being intermediate the top and bottom thereof to determine the depth and permit only a limited accumulation of water in each receptacle, substantially as and for the purpose set forth, and all of the outlets being normally open at the level described.

In testimony whereof I have signed my name to this specification, in the presence of two subscribing witnesses, this 7th day of April, A. D. 1893.

ORRIN H. FLAGG.

Witnesses:
 MAYHEW R. HITCH,
 MARY L. WEBSTER.